(No Model.)
C. M. GITT.
FARM GATE.
No. 401,648. Patented Apr. 16, 1889.
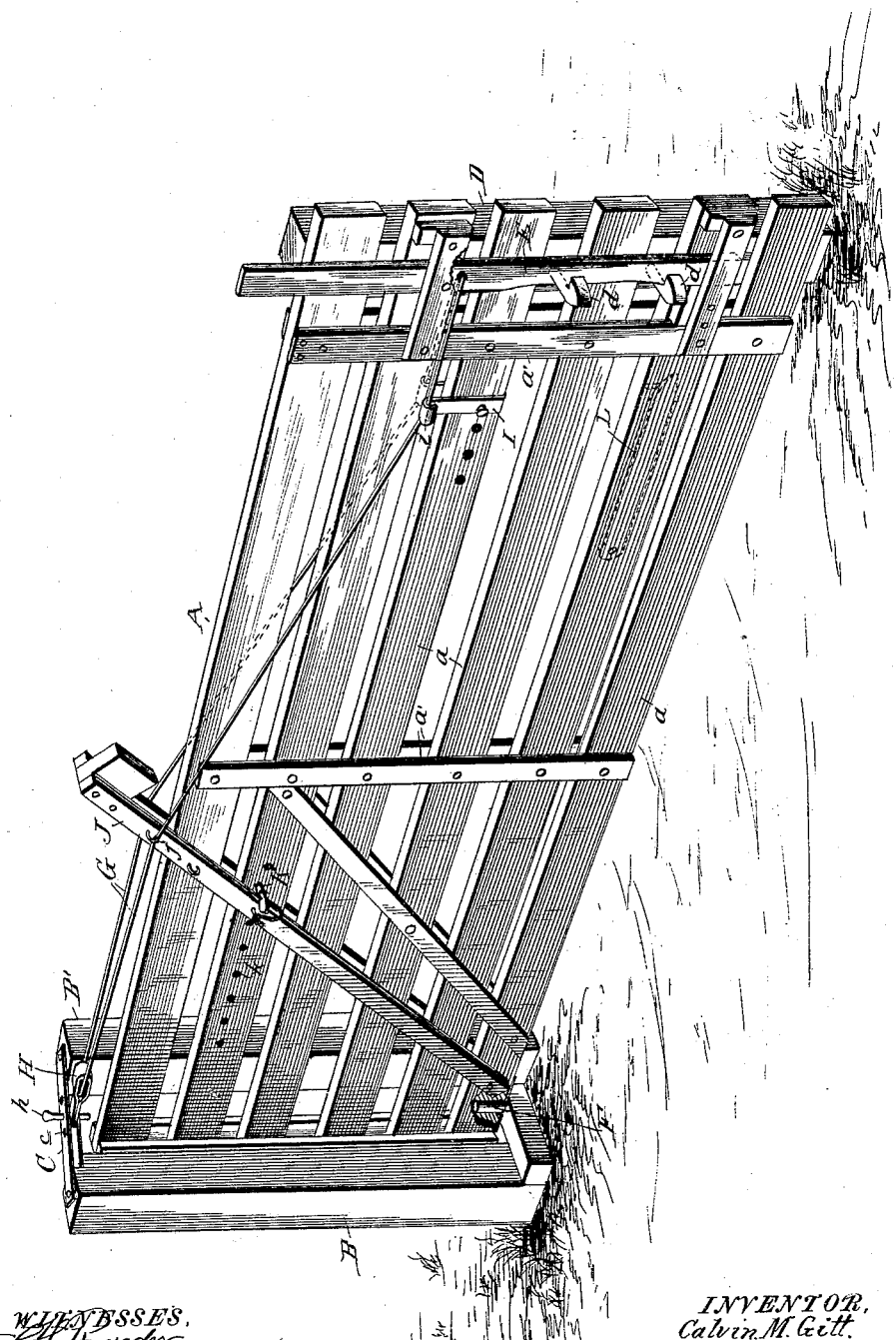
WITNESSES.
INVENTOR,
Calvin M. Gitt.
By R. S. & A. P. Lacey
Attorneys

UNITED STATES PATENT OFFICE.

CALVIN M. GITT, OF STANBERRY, MISSOURI.

FARM-GATE.

SPECIFICATION forming part of Letters Patent No. 401,648, dated April 16, 1889.

Application filed December 28, 1888. Serial No. 294,888. (No model.)

*To all whom it may concern:*

Be it known that I, CALVIN M. GITT, a citizen of the United States, residing at Stanberry, in the county of Gentry and State of Missouri, have invented certain new and useful Improvements in Farm-Gates; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

This invention relates to farm-gates which close by gravity, and which can be adjusted to separate stock.

The object of the invention is to throw all or nearly all the weight to the heel of the gate and to have as few parts as possible. The gate is hung at its upper end by a wire or chain, and a lever pivoted at its lower end to the bottom of the gate, near the pivotal point thereof, is weighted and adjustable at its upper end to vary the height or level of the gate. The latch is connected with the said wire, and is held closed by the gravity of the gate.

The improvement consists of the novel features which will be hereinafter more fully described and claimed, and which are shown in the annexed drawing, which is a perspective view of a gate embodying my invention.

The gate A, of ordinary construction, is composed of a series of longitudinal rails, $a$, and vertical battens $a'$. The hinged end of the gate is arranged between the posts B and B', which are set in the ground, and are united at their upper ends by the plates C. These posts are set the one in advance of the other, so as to permit the gate to swing open.

The free end of the gate rests against the latch-post D, and is held closed by the hooks $d$ $d$. These engage with the latch E, which extends above the gate to be readily grasped by a person on horseback.

The gate is mounted at its inner lower corner on the pin F, which is anchored in the ground or otherwise secured in place.

The upper end of the gate is supported by the wires G, which extend from the front end of the gate to a clevis, H, adjustably connected with the plates C by the pin $h$, passing through the clevis and through one of a series of openings, $c$, in the said plates. The wires G, two being provided, extend upon each side of the gate and have their front ends connected with the latch-bar E.

The stirrup I, placed on one of the rails of the gate, has the ends of its vertical branches curled around to form guides $i$, which receive the wires G, and is adjustable on the said rail, to effect a slight vertical adjustment of the free end of the gate and to cause the wires to draw on the latch-bar in a horizontal line.

The lever J, pivoted at its lower end to the lower end of the gate near its pivotal point, extends obliquely across the gate, and is weighted at its upper end, and is composed of two bars, one on each side of the gate. The wires G pass through staples $j$ in the sides of the lever. This lever is adjustable about its pivotal connection with the gate, and is held in an adjusted position by the pin K, which is adapted to be inserted in one of the series of openings $k$ in a rail of the gate.

The clevis H is adjustable on the plates C, to regulate the force necessary to close the gate, whereby the gate can be made to close more or less rapidly. This will be readily understood when it is observed that the plates C are arranged obliquely, and that adjusting the pin $h$ on the plates brings it vertically over the pin F, more or less.

The operation of the gate will be readily understood from the foregoing description, reference being had to the accompanying drawing.

The prop L, pivoted to the gate, is for holding the gate open any required distance.

Having thus described my invention, what I claim, and desire to secure by Letters Patent is—

1. The combination, with the gate mounted on a pin at its inner lower end, of the connection, as the wires G, interposed between the front portion of the gate and the gate-post, and the lever J, pivoted to the gate and extending obliquely, and adjustably connected with the gate at its upper end and having the said connection engaged therewith, substantially as and for the purpose described.

2. The combination of the gate mounted on a pin at its inner lower end, the posts B and B', the plates C, connecting the upper ends of the posts, the wires G, the clevis adjustably connected with the plates C and supporting the inner ends of the wires, the latch-bar having the wires G connected therewith, the stirrup I, engaged with the said wires and adjustable on the gate, and the oblique lever J, weighted at its upper end and adjustable on the gate and having engagement with the said wires, substantially as described.

In testimony whereof I affix my signature in presence of two witnesses.

CALVIN M. GITT.

Witnesses:
  GEO. NICKSON,
  O. M. LYNN.